US009547880B2

(12) United States Patent
Yuan

(10) Patent No.: US 9,547,880 B2
(45) Date of Patent: Jan. 17, 2017

(54) PARALLEL PROCESSING IMAGE DATA HAVING TOP-LEFT DEPENDENT PIXELS

(75) Inventor: Hao Yuan, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 13/997,842

(22) PCT Filed: Apr. 9, 2012

(86) PCT No.: PCT/CN2012/000457
§ 371 (c)(1),
(2), (4) Date: Dec. 26, 2014

(87) PCT Pub. No.: WO2013/152452
PCT Pub. Date: Oct. 17, 2013

(65) Prior Publication Data
US 2015/0123979 A1 May 7, 2015

(51) Int. Cl.
*G06T 1/20* (2006.01)
*G06F 15/80* (2006.01)

(52) U.S. Cl.
CPC .............. *G06T 1/20* (2013.01); *G06F 15/8007* (2013.01); *G06T 2200/28* (2013.01)

(58) Field of Classification Search
CPC ..... G06T 1/20; G06T 2200/28; G06F 15/8007
USPC ....................................................... 345/520
See application file for complete search history.

(56) References Cited

U.S. PATENT DOCUMENTS

| 2008/0126812 A1* | 5/2008 | Ahmed | H04N 19/61 |
| | | | 713/189 |
| 2009/0300621 A1* | 12/2009 | Mantor | G06F 9/30087 |
| | | | 718/100 |
| 2011/0075026 A1 | 3/2011 | Wallace et al. | |

FOREIGN PATENT DOCUMENTS

| CN | 1953502 A | 4/2007 |
| CN | 102047241 A | 5/2011 |
| WO | 2013152452 A1 | 10/2013 |

OTHER PUBLICATIONS

Zhao et al., Data Partition for Wavefront Parallelization of H.264 Video Encoder, 2006, IEEE, 0-7803-9390-2/06, p. 2669-2672.*
International Search Report and Written Opinion received for PCT application No. PCT/CN2012/000457, mailed on Jan. 24, 2013, 9 pages.
Search Report for European Patent Application No. 12874296.2, mailed on Dec. 15, 2015, 9 pages.
Kung, S., "VLSI Array Processors", IEEE ASSP Magazine, IEEE, US, pp. 4-22, Jul. 1, 1985.
Agarwal et al., "Automatic Partitioning of Parallel Loops and Data Arrays for Distributed Shared-Memory Multiprocessors", IEEE Transactions on Parallel and Distributed Systems, IEEE Service Center, pp. 943-962, Sep. 1, 1995.

(Continued)

*Primary Examiner* — Gregory J Tryder
*Assistant Examiner* — Yuehan Wang
(74) *Attorney, Agent, or Firm* — Jordan IP Law, LLC

(57) ABSTRACT

Methods and systems may include logic to identify a plurality of blocks in image data having one or more top-left dependent pixels, and select the plurality of blocks in a wavefront order for processing. In addition, the logic may process a plurality of pixels in each block in the wavefront order. The system may also include a display device to output a result associated with processing the plurality of pixels.

26 Claims, 4 Drawing Sheets

(56) References Cited

OTHER PUBLICATIONS

Yang et al., "A GPGPU Compiler for Memory Optimization and Parallelism Management", Proceedings of the 31st ACM SIGPLAN Conference on Programming Language Design and Implementation, pp. 86-97, Jun. 5, 2010.

Kung et al., "Wavefront Array Processor: Language, Architecture, and Applications", IEEE Transactions on Computers, IEEE Service Center, pp. 1054-1066, Nov. 1, 1982.

\* cited by examiner

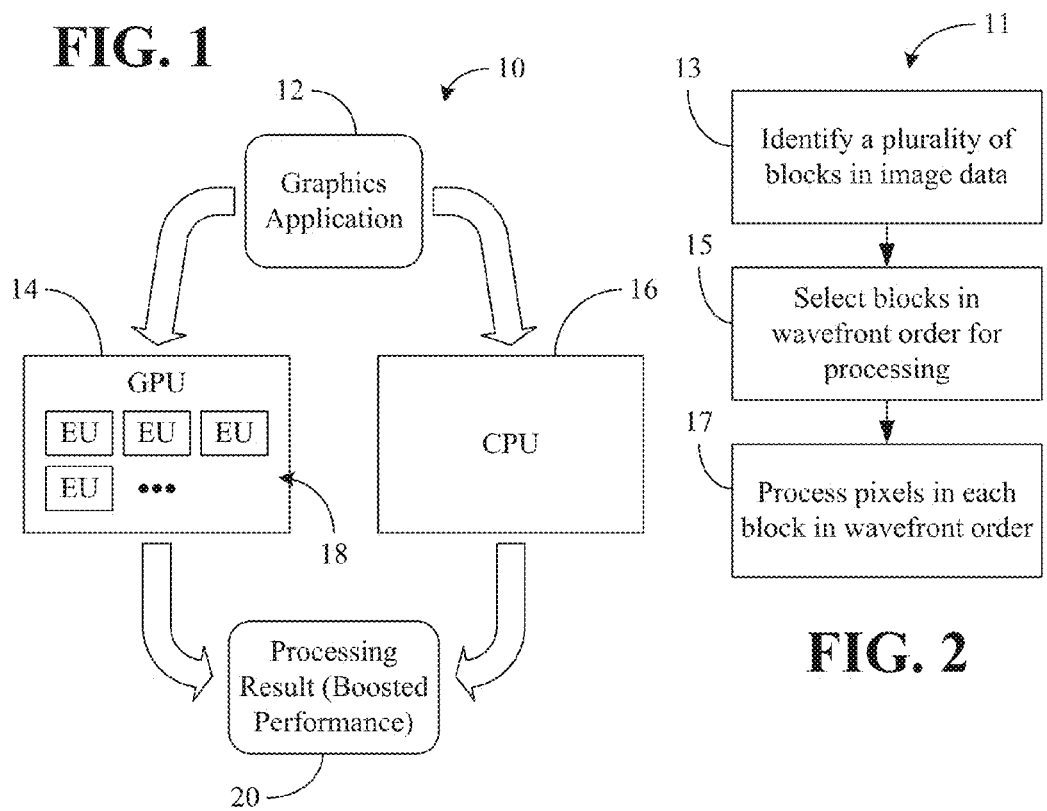
FIG. 1
FIG. 2
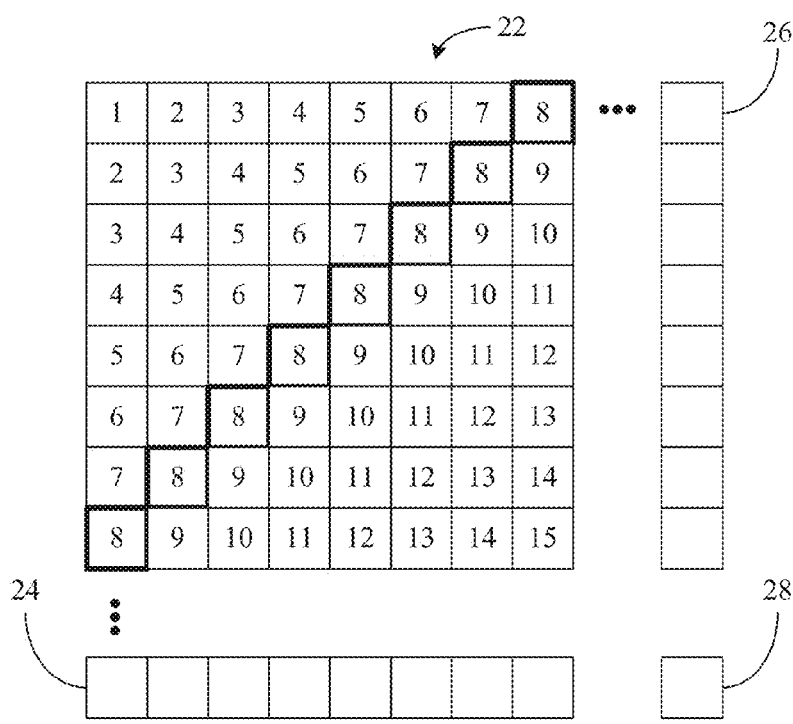
FIG. 3

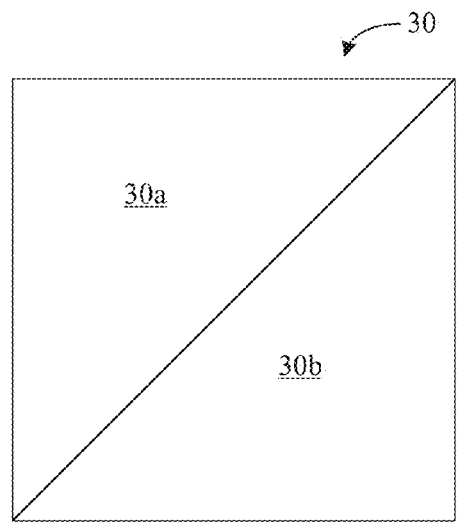
FIG. 4
FIG. 5
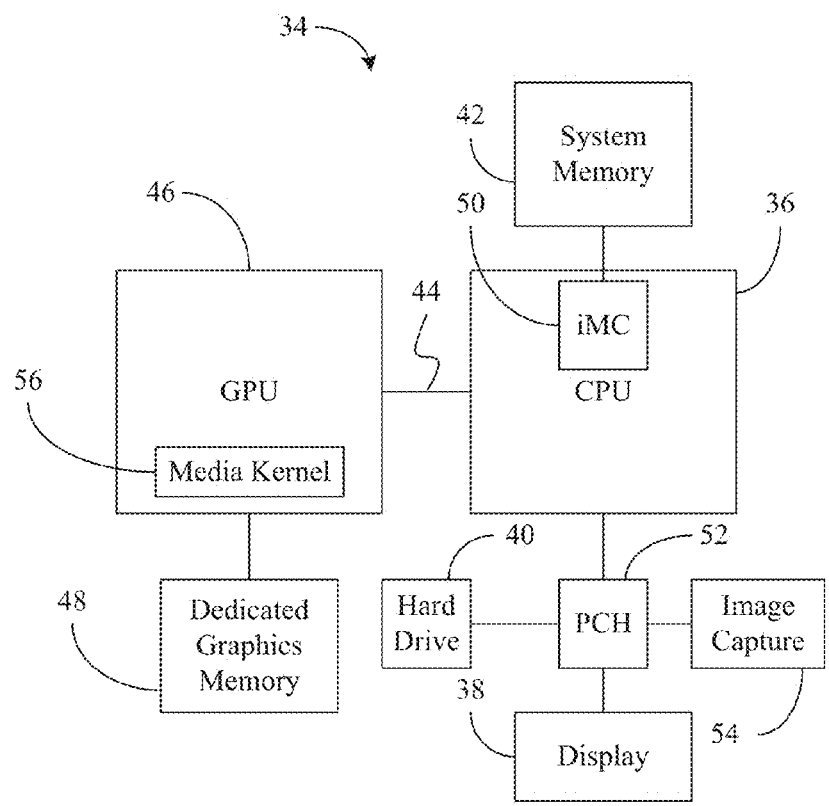
FIG. 6

PARALLEL PROCESSING IMAGE DATA HAVING TOP-LEFT DEPENDENT PIXELS

BACKGROUND

Computationally intensive aspects of graphics applications may be executed on a graphics processing unit (GPU) of a computing system, wherein the GPU may have significant parallel processing capability in order to enhance performance. Certain graphics applications, however, may have pixel dependency issues that prevent parallel processing under conventional approaches. For example, image data with top-left dependent pixels might be processed sequentially (e.g., by column, then row) in a conventional system, wherein sequential processing may fail to adequately leverage GPU parallel processing capabilities. As a result, performance may be negatively impacted.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a block diagram of an example of a GPU computing architecture according to an embodiment;

FIG. 2 is a flowchart of an example of a method of processing image data according to an embodiment;

FIG. 3 is a block diagram of an example of a wavefront order processing approach according to an embodiment;

FIG. 4 is a block diagram of an example of a data block that is partitioned into an upper left section and a lower right section according to an embodiment;

FIG. 5 is a block diagram of an example of a pixel selection approach according to an embodiment;

FIG. 6 is a block diagram of a system according to an embodiment;

DETAILED DESCRIPTION

Figure 7:
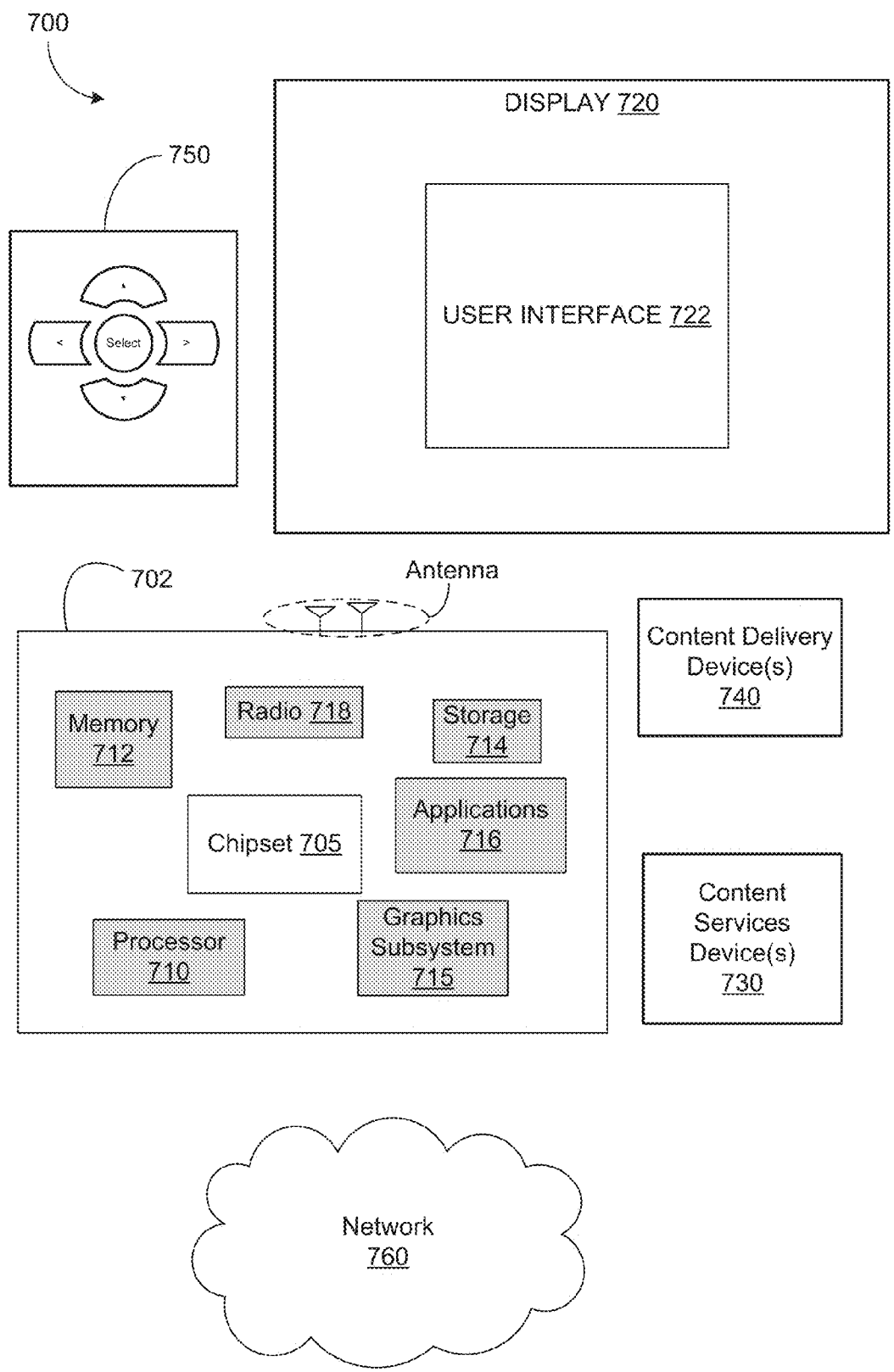
FIG. 7 is a block diagram of an example of a system having a navigation controller according to an embodiment.

Turning now to FIG. 1, an architecture 10 is shown in which a graphics processing unit (GPU) 14 is used to boost the performance of a graphics application 12 executing in a computing system having a central processing unit 16. In the illustrated example, the GPU 14 has an execution unit (EU) array 18 that enables the GPU 14 to achieve a high level of data parallelism. For example, while a portion of the graphics application 12 may be executed on the CPU 16, a portion of the graphics application 12 may also be executed on the GPU 14, wherein the portion executed on the GPU 14 may typically represent computationally intensive operations and/or calculations such as multiplication operations, division operations, and so forth. More particularly, the GPU 14 may be implemented as a multi-core and multi-threaded architecture, wherein each thread can be executed on an EU in parallel. As will be discussed in greater detail, the GPU 14 can be configured to partition the image data into multiple blocks and dispatch single instruction multiple data (SIMD) instructions to the EU array 18 in order to conduct these computationally intensive operations in a highly parallel manner.

Moreover, such parallelism may be achieved even for image data having pixel dependencies such as top-left dependent pixels. [0001] For example, consider the following pseudo code for column "x", and row "y" (using C language notation),

```
For (y=0; y<ImageHeight; y++)
    top_y = (y-1 >= 0 ? y-1 : y);
    For (x=0; x<ImageWidth; x++)
        Left_x = (x-1 >= 0 ? x-1 : x);
        OutputPixel[y][x] = OutputPixel[top_y][x] +
        OutputPixel[y][left_x].
```

In order to calculate the current OutputPixel, the left and top OutputPixel is needed. Rather than processing the image data in a sequential order, the illustrated architecture 10 provides for processing the image data in a "wavefront" order, wherein the processing results 20 of the illustrated architecture 10 can exhibit boosted performance even in scenarios in which pixel dependencies are involved.

FIG. 2 shows a method 11 of processing image data. The method 11 may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method 11 may be written in any combination of one or more programming languages, including an object oriented programming language such as C++ or the like and conventional procedural programming languages, such as the "C" programming language or similar programming languages.

In one example, the method 11 is implemented via a high-level media kernel programming language such as CM (C for media), which is based on standard C++ language with some restrictions, plus additional features that are designed for easy expression of data parallelism in media applications and a simplified interface with architecture specific hardware features (e.g., vector and matrix data type hardware). Alternatively, the method 11 could be implemented using any of the aforementioned circuit technologies. Illustrated processing block 13 provides for identifying a plurality of blocks in image data having one or more top-left dependent pixels. The plurality of blocks may be selected in a wavefront order for processing at block 15, wherein illustrated block 17 processes a plurality of pixels in each block in the wavefront order.

FIG. 3 shows a data block 22 having top-left dependent pixels, wherein the top-leftmost pixel (e.g., labeled "1") is processed first in the block 22, and the bottom-rightmost pixel (e.g., labeled "15") is processed last in the block 22. In the illustrated example, a wavefront order is used to select and process the pixels in between, wherein data parallelism can be employed in order to enhance performance. In particular, the second "wave" of pixels (e.g., labeled "2") is processed after the first pixel and in parallel using, for example, a SIMD instruction that may be dispatched to an EU array such as the EU array 18 (FIG. 1). Next, the third wave of pixels (e.g., labeled "3") is processed in parallel, then the fourth wave of pixels (e.g., labeled "4") is processed in parallel, and so forth. Accordingly, the top-left dependency is maintained and maximum data parallelism is achieved in the example shown.

More particularly, if the data block has a block size of "b" (e.g., dimension of b×b pixels), the image width is "W", and the image height is "H", a pixel 24 may be represented by the relationship H/b, a pixel 26 may be represented by the relationship W/b, and a pixel 28 may be represented by the relationship (W+H)/b−1. In the illustrated example, the block size is 8×8, although other block sizes may be used. Thus, the illustrated solution provides for processing the data block 22 in fifteen iterations, whereas a conventional sequential (e.g., by column, then row) processing approach may involve sixty-four iterations to process the data block 22.

FIG. 4 shows a data block 30 (30a, 30b) that is partitioned into an upper left section 30a and a lower right section 30b. In each section, a vector parameter (e.g., "vector_ref", discussed below) may be used to process image data in matrix format. As will be discussed in greater detail, such a partitioning can enable the selection and processing of pixels to be conducted in a highly efficient manner.

For example, FIG. 5 demonstrates that the pixel elements for calculations can be easily selected by altering an offset parameter and a mask parameter in a for-loop. In the illustrated example, for an (N+1)*(N+1) block 32, N elements may be selected in each loop, starting from the offset value. Thus, N equals six in the example shown. The stride for the select operation may therefore be N, enabling the elements to be selected in a wavefront order.

Moreover, a mask can be used to remove the elements that are not needed in a particular iteration. For example, the mask may be set to 0b1, 0b11, 0b111, 0b111 ... 0b11111111 (N=8) for each loop. For n calculations in the upper left section, the offset may be initially set to point to the top-leftmost element (e.g., labeled "1") in the illustrated example. Since the mask would be 0b1 for the first iteration, only the top-leftmost element would be used. Similarly, in the bottom right section, the offset may be initially set to point to the first wave of elements in that section (e.g., labeled "7").

Example pseudo code to achieve this functionality may be implemented as follows.

```
// mask = 1, 11, 111, 1111,..., 11111111 (N=8)
For (int i = 0; i < N; i++)
{
    offset++;
    // NOTE: Matrix is N+ 1 x N+1, but stride = N
    vector_ref<uint1, N> left = ...; (select left pixel by stride and offset)
    vector_ref<uint1, N> top = ...; (select top pixel by stride and offset)
    vector_ref<uint1, N> current =...; (select current pixel by stride and offset)
    mask(i) = 1;
    // operates on selected elements
    ...;
}
// Wind down in opposite direction
// mask = 11111110, 11111100,... 10000000 (N=8)
For (int i = 0; i < N−1; i++)
{
    offset++;
    // NOTE: Matrix is N+1xN+1, but stride = N
    vector_ref<uint1, N> left=...; (select left pixel by stride and offset)
    vector_ref<uint1, N> top=...; (select top pixel by stride and offset)
    vector_ref<uint1, N>current=...; (select current pixel by stride and offset)
    mask(i) = 0;
    //operates on selected elements
    ...;
}
```

Turning now to FIG. 6, a computing system 34 is shown in which wavefront order processing is implemented. The computing system 34 may be part of a mobile platform such as a laptop, PDA (personal digital assistant), wireless smart phone, media player, imaging device, MID (mobile Internet device), any smart device such as a smart phone, smart tablet and so forth, or any combination thereof. The illustrated computing system 34 includes a CPU 36, a display device 38, a hard disk drive 40 and system memory 42, which could include, for example, double data rate (DDR) synchronous dynamic random access memory (SDRAM, e.g., DDR3 SDRAM JEDEC Standard JESD79-3C, April 2008) modules. The modules of the system memory 42 may be incorporated into a single inline memory module (SIMM), dual inline memory module (DIMM), small outline DIMM (SODIMM), and so forth.

The computing system 34 may include a graphics bus (e.g., slot) 44, wherein a graphics card (not shown) containing a graphics processing unit (GPU) 46 and dedicated graphics memory 48 could be coupled (e.g., plugged into) the graphics bus 44. For example, the graphics bus 44 could include a PCI Express Graphics (PEG, e.g., Peripheral Components Interconnect/PCI Express x16 Graphics 150W-ATX Specification 1.0, PCI Special Interest Group) bus, an Accelerated Graphics Port (e.g., AGP V3.0 Interface Specification. September 2002) bus, and so forth. The CPU 36 may have an integrated memory controller (iMC) 50, and one or more processor cores (not shown) to execute one or more drivers associated with a host OS (operating system) and/or application software, wherein each core may be fully functional with instruction fetch units, instruction decoders, level one (L1) cache, execution units, and so forth. The CPU 36 could alternatively communicate with an off-chip variation of the iMC 50, also known as a Northbridge, via a front side bus. The illustrated CPU 36 communicates with a platform controller hub (PCH) 52, also known as a Southbridge, via a hub bus. The iMC 50/CPU 36 and the PCH 52 are sometimes referred to as a chipset.

The illustrated computing system 34 also includes an image capture module 54, which may be used to obtain video content for visual output via the display device 38. The image capture module 54 could include, for example, a camera, camcorder, etc. The video content may also be obtained from the hard drive 40, the system memory 42, software (e.g., media player, game player) running on the CPU 36 and/or GPU 46, or from an off-platform device (e.g., web server, remote image capture device, etc.) via a network controller (not shown). The illustrated GPU 46 is configured to execute media kernel logic 56 that identifies a plurality of blocks in image data having one or more top-left dependent pixels, selects the plurality of blocks in a wavefront order for processing, and processes a plurality of pixels in each block in the wavefront order. In one example, processing the plurality of pixels includes dispatching one or more parallel processing instructions such as SIMD instructions, to an array of execution units in the GPU 46, as already discussed.

Embodiments may therefore include a method of processing image data in which a plurality of blocks is identified in image data having one or more top-left dependent pixels. The method may also provide for selecting the plurality of blocks in a wavefront order for processing, and processing a plurality of pixels in each block in the wavefront order.

Embodiments can also include a system having logic to identify a plurality of blocks in image data with one or more top-left dependent pixels, and select the plurality of blocks in a wavefront order for processing. In addition, the logic may process a plurality of pixels in each block in the wavefront order. The system may also include a display device to output a result associated with processing the plurality of pixels.

Other embodiments may also include at least one computer readable storage medium having a set of instructions which, if executed by a processor, cause a computer to identify a plurality of blocks in image data having one or more top-left dependent pixels. The instructions can also cause a computer to select the plurality of blocks in a wavefront order for processing, and process a plurality of pixels in each block in the wavefront order.

Moreover, embodiments may involve a method of processing image data in which image data is received in a graphics processing unit, wherein the image data is associated with a graphics application and includes one or more top-left dependent pixels. The method can also provide for identifying a plurality of blocks in the image data, selecting the plurality of blocks in a wavefront order for processing, and processing a plurality of pixels in each block in the wavefront order, wherein processing the plurality of pixels includes dispatching one or more parallel processing instructions.

FIG. 7 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (1/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
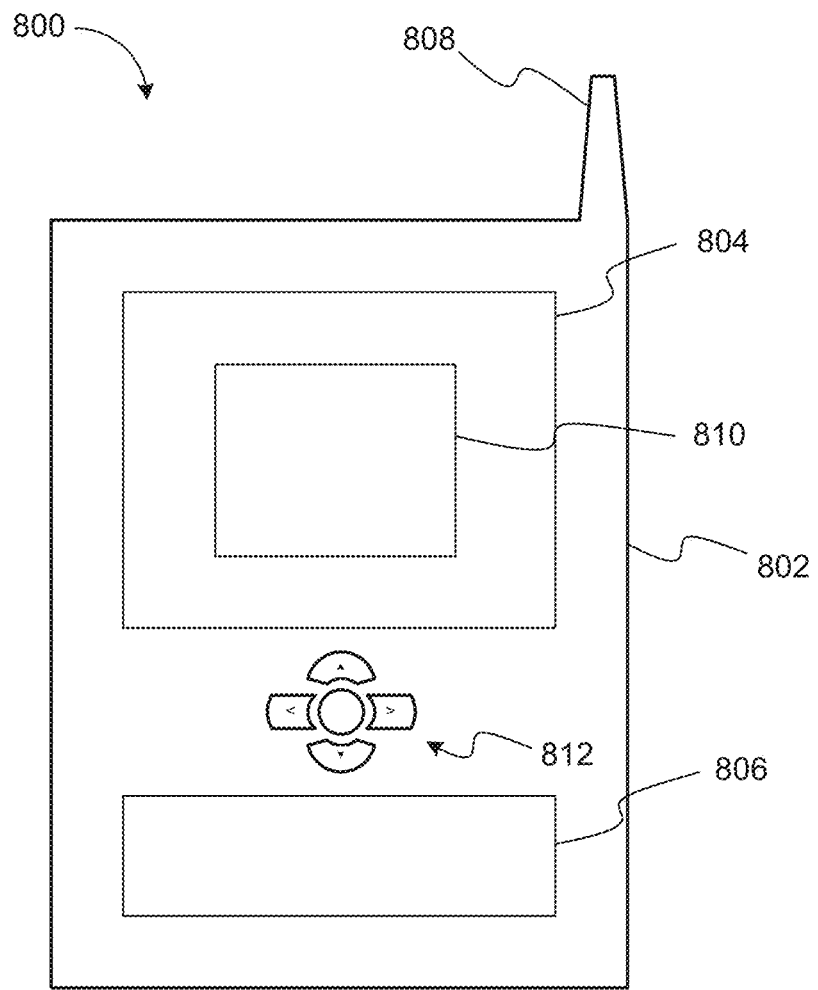
FIG. 8 is a block diagram of an example of a system having a small form factor according to an embodiment.

As described above, system 700 may be embodied in varying physical styles or form factors. FIG. 8 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may comprise a housing 802, a display 804, an input/output (I/O) device 806, and an antenna 808. Device 800 also may comprise navigation features 812. Display 804 may comprise any suitable display unit 810 for displaying information appropriate for a mobile computing device. I/O device 806 may comprise any suitable L/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Techniques described herein may therefore provide a feed-forward system that ensures both real-time operation of the consumer video pipeline and dynamic updating of the operating pipeline to deliver optimal visual perceptual quality and viewing experience. In particular, a discrete control system for the video pipeline can dynamically adapt operating points in order to optimize a global configuration of interactive component modules that are related to video perceptual quality. In a series configuration, the perceptual quality analysis module may be placed before the video processing pipeline and parameters determined for the post-processing pipeline may be used for the same frame. In the case of distributed computation of the quality analysis block or when perceptual quality analysis needs to be performed at intermediate points in the pipeline, the parameters determined using a given frame may be applied on the next frame to ensure real-time operation. Distributed computation is sometimes beneficial in reducing complexity as certain elements for perceptual quality computation may already be computed in the post-processing pipeline and can be re-used. Illustrated approaches may also be compatible with closed-loop control where the perceptual quality analysis is re-used at the output of the video processing pipeline to estimate output quality, which is also used by the control mechanism.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   receiving image data in a graphics processing unit, wherein the image data is associated with a graphics application and includes one or more top-left dependent pixels;
   identifying a plurality of blocks in the image data;
   selecting the plurality of blocks in a wavefront order for processing;
   partitioning each block into an upper left section and a lower right section of equal portions, wherein the upper left section and the lower right section each use a vector reference; and
   processing a plurality of pixels in each block in the wavefront order, wherein processing the plurality of pixels includes dispatching one or more parallel processing instructions to parallel process the upper left section and the lower right section using the vector reference.

2. The method of claim 1, wherein the one or more parallel processing instructions include one or more single instruction multiple data (SIMD) instructions.

3. The method of claim 1, wherein processing the plurality of pixels includes:
   altering an offset parameter and a mask parameter to select pixels in the upper left section and the lower right section of each block for processing, wherein the pixels are selected starting from the offset parameter.

4. The method of claim 1, wherein a media kernel is used to select the plurality of blocks and process the plurality of pixels.

5. The method of claim 4, wherein the media kernel is a C for media (CM) kernel.

6. A method comprising:
   identifying a plurality of blocks in image data having one or more top-left dependent pixels;
   selecting the plurality of blocks in a wavefront order for processing;
   partitioning each block into an upper left section and a lower right section of equal portions, wherein the upper left section and the lower right section each use a vector reference; and
   processing a plurality of pixels in each block in the wavefront order, wherein processing the plurality of pixels includes dispatching one or more parallel processing instructions to parallel process the upper left section and the lower right section using the vector reference.

7. The method of claim 6, wherein the one or more parallel processing instructions include one or more single instruction multiple data (SIMD) instructions.

8. The method of claim 6, wherein processing the plurality of pixels includes:
   altering an offset parameter and a mask parameter to select pixels in the upper left section and the lower right section of each block for processing, wherein the pixels are selected starting from the offset parameter.

9. The method of claim 6, wherein a media kernel is used to select the plurality of blocks and process the plurality of pixels.

10. The method of claim 9, wherein the media kernel is a C for media (CM) kernel.

11. The method of claim 6, further including receiving the image data in a graphics processing unit.

12. The method of claim 6, wherein the image data is associated with a graphics application.

13. A system comprising:
   logic to,
      identify a plurality of blocks in image data having one or more top-left dependent pixels,
      select the plurality of blocks in a wavefront order for processing,
      partition each block into an upper left section and a lower right section of equal portions, wherein the upper left section and the lower right section each use a vector reference,
      process a plurality of pixels in each block in the wavefront order, by dispatching one or more parallel processing instructions to parallel process the upper left section and the lower right section using the vector reference, and
   a display device to output a result associated with processing the plurality of pixels.

14. The system of claim 13, wherein the one or more parallel processing instructions are to include one or more single instruction multiple data (SIMD) instructions.

15. The system of claim 13, wherein the logic is to,
   alter an offset parameter and a mask parameter to select pixels in the upper left section and the lower right section of each block for processing, wherein the pixels are selected starting from the offset parameter.

16. The system of claim 13, wherein the logic includes media kernel logic.

17. The system of claim 16, wherein the media kernel logic is C for media (CM) kernel logic.

18. The system of claim 13, further including:
   a central processing unit (CPU); and
   a graphics processing unit (GPU), wherein the logic is to receive the image data in the GPU.

19. The system of claim 13, wherein the image data is to be associated with a graphics application.

20. At least one non-transitory computer readable storage medium comprising a set of instructions which, if executed by a processor, cause a computer to:

identify a plurality of blocks in image data having one or more top-left dependent pixels;

select the plurality of blocks in a wavefront order for processing;

partition each block into an upper left section and a lower right section of equal portions, wherein the upper left section and the lower right section each use a vector reference; and process a plurality of pixels in each block in the wavefront order, by dispatching one or more parallel processing instructions to parallel process the upper left section and the lower right section using the vector reference.

21. The medium of claim 20, wherein the one or more parallel processing instructions are to include one or more single instruction multiple data (SIMD) instructions.

22. The medium of claim 20, wherein the set of instructions, if executed, cause a computer to:

alter an offset parameter and a mask parameter to select pixels in the upper left section and the lower right section of each block for processing, wherein the pixels are selected starting from the offset parameter.

23. The medium of claim 20, wherein the set of instructions include media kernel instructions.

24. The medium of claim 23, wherein the media kernel instructions include C for media (CM) kernel instructions.

25. The medium of claim 20, wherein the set of instructions, if executed, cause a computer to receive the image data in a graphics processing unit (GPU).

26. The medium of claim 20, wherein the image data is to be associated with a graphics application.

* * * * *